United States Patent [19]

Murai

[11] Patent Number: 5,154,250
[45] Date of Patent: Oct. 13, 1992

[54] AUTOMATIC SPEED CONTROL SYSTEM
[75] Inventor: Takeshi Murai, Hatsukaichi, Japan
[73] Assignee: Mazda Motor Corporation, Hiroshima, Japan
[21] Appl. No.: 766,264
[22] Filed: Sep. 27, 1991
[30] Foreign Application Priority Data Sep. 28, 1990 [JP] Japan .................................. 1-262081

[51] Int. Cl.[5] ...................... B60K 31/04; B60K 41/04
[52] U.S. Cl. ..................................... 180/179; 180/177; 74/866; 364/424.1
[58] Field of Search ...................... 74/866; 364/424.1; 180/177, 179

[56] References Cited

U.S. PATENT DOCUMENTS

| | | | |
|---|---|---|---|
| 4,285,252 | 8/1981 | Yamaki et al. ..................... | 74/866 O |
| 4,709,595 | 12/1987 | Hayama ............................ | 180/177 X |
| 4,736,813 | 4/1988 | Hayama et al. ................... | 180/177 O |
| 4,933,859 | 6/1990 | Tsuyama et al. ................. | 180/179 X |
| 4,967,358 | 10/1990 | Etoh ................................. | 180/179 X |
| 4,982,805 | 1/1991 | Naitou et al. ..................... | 180/179 O |

FOREIGN PATENT DOCUMENTS 63-137037  6/1988  Japan .

Primary Examiner—Rodney H. Bonck
Assistant Examiner—Daniel Wittels
Attorney, Agent, or Firm—Keck, Mahin & Cate

[57] ABSTRACT

An automatic speed control system has a device for detecting an actual speed of vehicle, a device for setting a target speed of the vehicle, and a device for controlling the actual speed so that it approaches the target speed by adjusting a throttle opening. The improved system includes a down-shift device for making a down-shift operation of a transmission so as to accomplish the target speed under a predetermined condition when the vehicle runs on an uphill rod, and uphill end judge device for holding that an end of the uphill road has been reached when the throttle opening is reduced beyond a predetermined value from a maximum value after the down-shift operation. An uphill end of a short length can be properly detected so that a desirable speed control can be accomplished.

9 Claims, 5 Drawing Sheets

AUTOMATIC SPEED CONTROL SYSTEM

BACKGROUND OF THE INVENTION

1. Field of the Invention

The present invention relates to an automatic speed control system for a vehicle, and more specifically to a speed control system which can find the termination of an uphill road.

2. Description of the Prior Art

There has been known an automatic speed control system in which a throttle opening is controlled based on a deviation of an actual vehicle speed from a target speed to get the target vehicle speed. Such a system is disclosed in Japanese Patent Public Disclosure Application (JP A)No. 61-285233, laid open to the public in 1988 as Japanese Patent Public Disclosure No. 63-137,037.

In this automatic speed control, it is proposed that when the vehicle runs into an uphill road when the automatic speed control is being carried out, a transmission makes a down shift operation, such as one from a fourth stage, to a third stage so as to increase a drive torque to maintain a target speed during running on the uphill road. When the vehicle reaches the end of the uphill road, the transmission immediately makes an up-shift operation, such as one from the third stage, to the fourth stage so as to save fuel.

In order to make the above control, it is necessary to detect the end of the uphill road. If the uphill road has a constant gradient, the throttle opening is remarkably reduced when the vehicle stops running uphill and starts to run on a flat road. Therefore, the end of the uphill road can be detected by detecting the remarkable reduction of the throttle opening. In view of this, it has been proposed to determine that the end of the uphill road has been reached when the throttle opening is reduced beyond a predetermined value.

This manner for detecting the end of the uphill road can be properly applied for a long uphill road during which the throttle opening settles to a substantially constant value after a down-shift operation.

It should, however be noted that in some cases, an uphill road may terminate before the throttle opening settles down. Therefore, the above manner for detecting the uphill road can not be applied for a relatively short uphill road which ends before the throttle opening settles down after the down-shift operation.

SUMMARY OF THE INVENTION

It is, therefore, an object of the present invention to provide an appropriate manner for detecting an end of an uphill road.

It is another object of the present invention to provide an automatic speed control system which can detect an end of an uphill road properly.

The above and other object of the present invention can be accomplished by an automatic speed control system having means for detecting an actual speed of a vehicle. Means are provided for setting a target speed of the vehicle and means for controlling the actual speed to the target speed by adjusting a throttle opening are also provided. A down-shift means makes a down-shift operation of a transmission so as to accomplish the target speed under a predetermined condition when the vehicle runs on an uphill road, and uphill end judge means holds that an end of the uphill road has been reached when the throttle opening is reduced beyond a predetermined value from a maximum value after the down-shift operation. The amount of the reduction of the throttle opening can be detected by storing throttle opening greater than a stored value after the down-shift operation and by calculating the difference between a currently stored value and the latest value detected.

When the down-shift operation is made when the vehicle runs into an uphill road, the throttle opening is increased just after the down-shift operation. This is because the down-shift is made for eliminating a speed drop caused by running on the uphill road and for recovering the target speed. In addition, the vehicle speed is decreased temporarily just after the down-shift operation because of reduction of the gear ratio. As a result, the throttle opening starts increasing when the down-shift operation is made, is decreased when the target speed is accomplished and, thereafter, converges to a certain throttle opening with a slight fluctuation to provide a steady condition during running on the uphill road.

When the uphill road terminates before the steady condition is accomplished after the down-shift operation, the throttle opening begins to be decreased in the course of increasing before accomplishing a maximum value after the down-shift operation or in the course of decreasing after accomplishing the maximum value after the down-shift operation. In any case, the throttle opening is decreased from the maximum value after the down-shift was made and before the steady condition is accomplished when the vehicle runs off of a relatively short uphill road. Therefore, the end of the uphill road can be detected when a difference between the maximum value goes and the current value beyond a predetermined difference.

According to the present invention, the end of the uphill road can be detected properly, irrespective of the length of the road.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Figure 1:
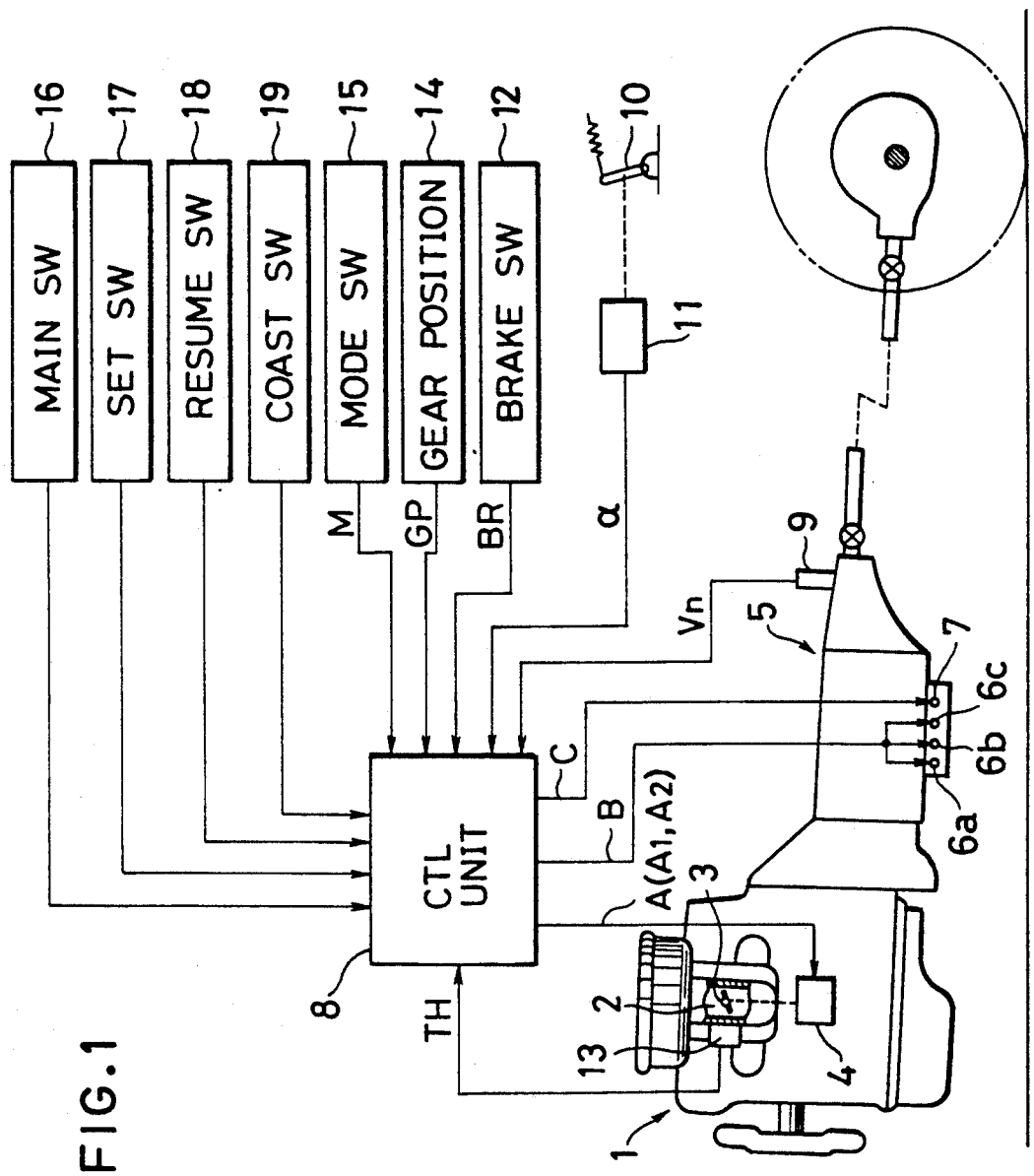
FIG. 1 is a schematic view of a vehicle to which an automatic speed control system in accordance with the present invention can be installed.

FIG. 1 shows a schematic view of the vehicle to which the present invention can be applied.

Basic Structure

Referring to FIG. 1, an engine 1 is provided with an intake passage 2 in which a throttle valve 3 is disposed. The throttle valve 3 is operated by a throttle valve actuator 4 to change the opening thereof. An automatic transmission 5 is provided with a plurality of solenoids 6a, 6b and 6c for shift operation therein and a lock-up solenoid 7 for lock-up control. The solenoids 6a, 6b and 6c are turned on and off to switch a hydraulic path in a hydraulic circuit and selectively engage and disengage hydraulically driven members to establish a desirable shift stage of the automatic transmission. When the solenoid 7 is turned on and off, the lock-up clutch (not shown) is engaged and disengaged.

Figure 2:
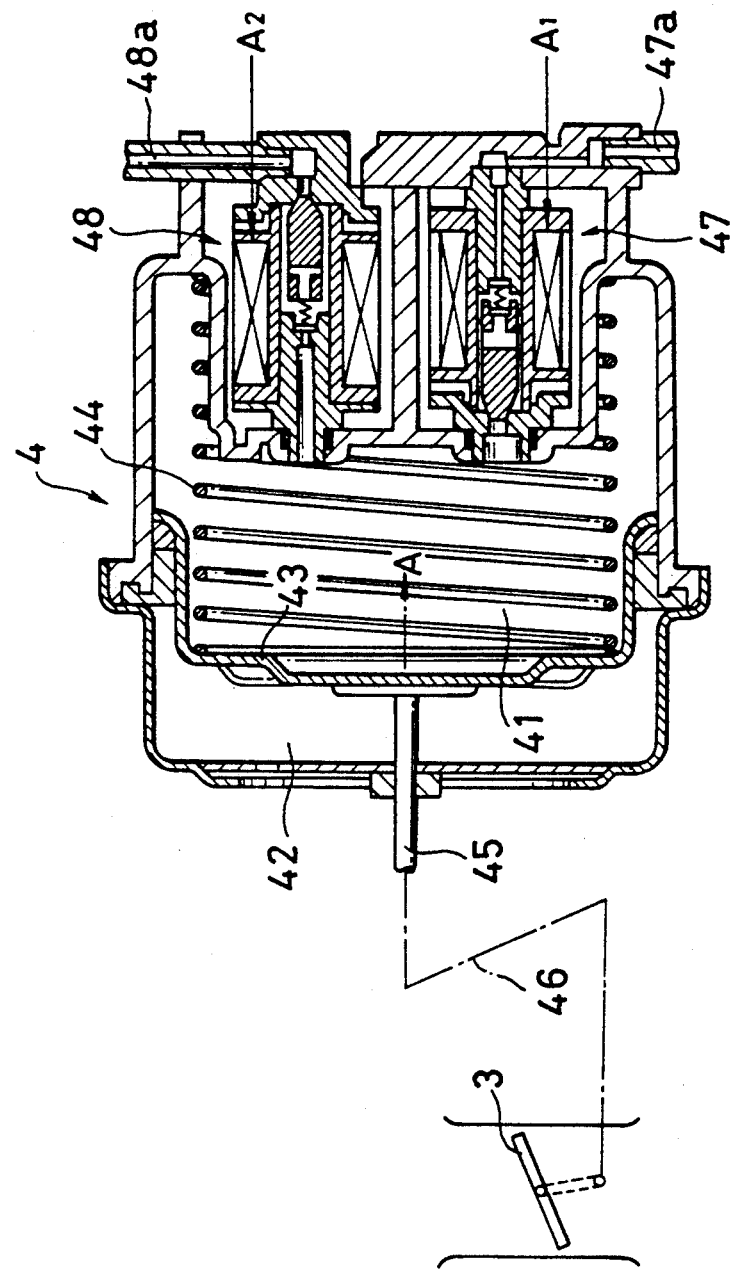
FIG. 2 is a sectional view of a throttle valve actuator employed in control system of FIG. 1.

Although a DC motor can be employed as the throttle valve actuator 4, an actuator which is actuated by a negative pressure is employed in the illustrated embodiment, as shown in FIG. 2. The actuator 4 includes a negative pressure chamber 41 for introducing a negative pressure produced in the engine, an atmospheric chamber 42 communicated with the atmosphere, a diaphragm 43 driven by the negative pressure introduced into the negative pressure chamber 41, a spring 44 urging the diaphragm 43 in the opposite direction to an arrow A, a rod 45 joined with the diaphragm 43, a throttle wire 46 connecting the rod 45 with the throttle valve 3 operably, a release passage 47a communicated with the atmosphere, a release control valve 47 of a magnetic and proportional operation for communicating the release passage 47a with the negative pressure chamber 41, a pull passage 48a to which the negative pressure is introduced, and a pull control valve 48 of a magnetic and proportional operation for communicating the pull passage 48a with the negative pressure chamber 41. A duty control is applied for solenoids of the control valves 47 and 48 so as to control the negative pressure in the negative pressure chamber 41 produced by the engine 1 so that the diaphragm 43 and the rod 45 produce a reciprocating movement for thereby causing the throttle valve 3 to be opened and closed through the throttle wire 46.

The throttle valve 3 and the automatic transmission 5 are controlled by a controller 8.

The controller 8 is provided for making an engine output control by controlling the throttle opening and a shift control by controlling the transmission 5. The controller 8 produces a control signal A to the throttle actuator 4 for controlling the throttle valve 3 and a signal B and signal C to the shift control solenoids 6a-6c and the lock-up solenoid 7 for controlling the automatic transmission 5. The signal A includes a release signal $A_1$ and a pull signal $A_2$, both of which are pulse signals. The pulse signals are introduced into the release control valve 47 and the pull control valve 48 of the throttle valve actuator 4 to control openings thereof by a predetermined duty ratio.

In order to control the throttle valve 3 and the automatic transmission 5, the controller 8 receives a vehicle speed signal Vn from vehicle speed sensor 9 for detecting an actual vehicle speed, an acceleration pedal opening signal α from an acceleration sensor 11 for detecting an acceleration stroke of an acceleration pedal 10, a braking signal BR from a brake switch 12 for detecting a braking operation, a throttle opening signal TH from a throttle sensor 13 for detecting an opening of the throttle valve 3, a gear position signal GP from a gear position sensor 14 for detecting a shift gear stage which is being selected in the automatic transmission 5, and a mode signal M from a mode switch 15 for detecting a shift mode selected in the transmission. Furthermore, the controller 8 receives signals from a main switch 16, a set switch 17, a resume switch 18 and a coast switch 19 of automatic speed control system. The main switch 16 turns on the power supply to start the automatic speed control system up. The set switch 17 is to set a target speed Vo. The resume switch 18 is to restore the target speed Vo when the automatic speed control is res ed after the control is off once.

Automatic Speed Control System for Uphill Road

In the illustrated automatic speed control system, when the vehicle runs into an uphill road, a down-shift operation is made to accomplish the target vehicle speed. When the uphill road ends, an up-shift operation is made. For this purpose, the illustrated control system including the controller 8 is provided with down-shift device 50 and first uphill end judge device 51 for finding a relatively short uphill road. Further, there is provided steady running judge device 52 and second uphill end judge device 53 for finding a relatively long uphill road.

Basic Automatic Speed Control

Figure 4:
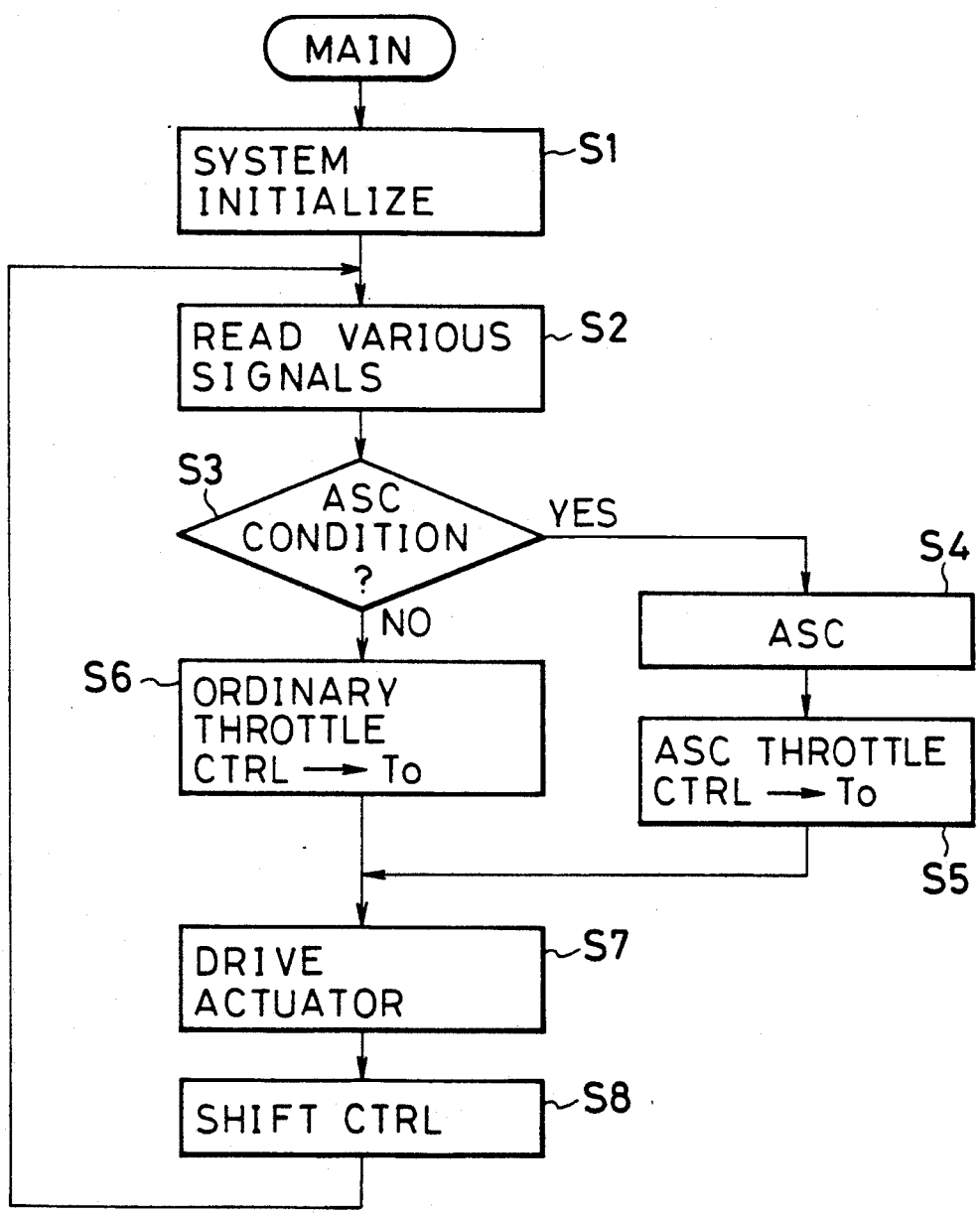
FIG. 4 is a flow chart of an automatic speed control in accordance with the preferred embodiment.

Hereinafter, there is described a basic automatic speed control makings reference to a flow chart of FIG. 4 showing a main routine of the control.

The controller 8 initializes the system in starting the control (S1) and receives signals from the various sensors (S2).

In step S3, the controller 8 judges whether or not it is conditioned for starting the automatic speed control, in other words whether or not the main switch is on, the shift range is in D range, and the vehicle speed is greater than a predetermined value (for example 40 km/h). On the other hand, when a braking action is made or one of the above condition is not satisfied, the automatic speed control is stopped.

When the above conditions are satisfied, the controller 8 carries out the automatic speed control in response to operations of the set switch 17, resume switch 18, coast switch 19, determines a control mode such as vehicle speed feedback mode, acceleration mode in response to operation of brake pedal and acceleration pedal (S4), and sets the target throttle opening To in response to the control mode (S5). When it is not conditioned for the automatic speed control, the controller 8 sets the target throttle opening To the amount of the stroke of the acceleration pedal (S6).

The controller 8 produces the control signal A corresponding to the target throttle opening To to the throttle actuator 4 (S7) for thereby controlling the throttle valve 3 to the target throttle opening To. The controller 8 determines the shift stage based on the vehicle speed Vn, the throttle opening TH, and the acceleration pedal stroke α, and produces the signals B, C to control the solenoids 6a-6c, and 7 of the transmission 5 (S8). This procedure is repeated at a predetermined time period (for example, every 30 msec).

In the vehicle speed feedback mode, the controller 8 calculates a throttle opening Tv for accomplishing the target vehicle speed Vo from the actual speed Vn based on the difference between the actual speed and the target speed, and PI-PD factor of the change in the actual speed and carries out the feedback control for the target throttle opening To.

If a braking operation is made during the feedback control, the controller 8 stops the feedback control and starts a throttle control under a normal mode. In the normal control mode, the controller 8 selects a map of a base throttle opening based on the acceleration pedal stroke α and the shift mode M (such as economy mode, normal mode, power mode) and calculates the base throttle opening Tb in response to the acceleration pedal stroke α and the gear stage. The controller 8 compensates the base throttle opening Tb taking account of the acceleration speed, vehicle speed, cooling water and the like so as to obtain a final throttle opening To as target throttle opening.

When the acceleration pedal stroke α is increased beyond a predetermined value ( for example 5%), the controller 8 selects the acceleration mode. In the acceleration mode, the controller 8 calculates the target throttle opening Tv corresponding to the target vehicle speed Vo and the base throttle opening Tb corresponding to the acceleration stroke α in light of the map and set the target throttle opening To at the sum of throttle openings Tv and Tb.

Automatic Speed Control for Uphill Road

As aforementioned, in the automatic speed control according to the present invention, a down-shift operation is made in uphill running and an up-shift operation is made when uphill running has ended to maintain the target speed. Such down-shift operation is made by means of the down-shift device 50 when the target speed cannot be accomplished with the current shift stage by means of the throttle control. In the illustrated embodiment, the down-shift device 50 holds that it is necessary to make the down-shift operation when the vehicle speed Vn is decreased and a difference between the vehicle speed Vn and the target speed Vo is increased beyond a threshold value β (for example 8 km/h).

Figure 5:
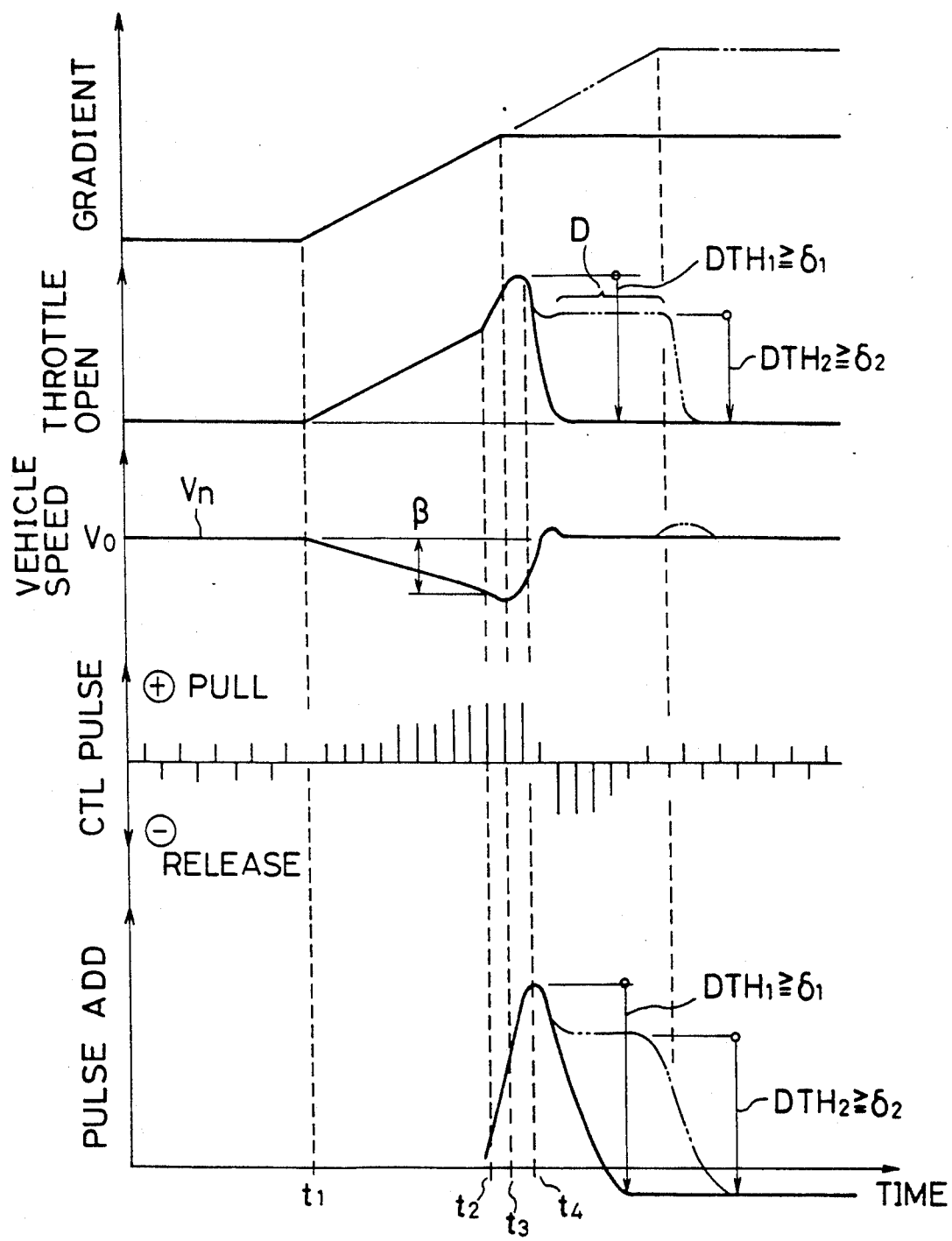
FIG. 5 is a time chart showing a relationship between throttle opening, vehicle speed and control signal.

Referring to FIG. 5, when the vehicle runs into a long uphill grade at a time $t_1$ in the case where the vehicle is in a steady condition with the fourth stage, the vehicle speed tends to be reduced due to an increase of the engine load so that the controller 8 increases the throttle opening.

When the vehicle speed Vn is reduced consistently and the difference DV (DV=Vo−Vn) between the actual vehicle speed Vn and the target vehicle speed Vo in spite of the increase of the throttle opening is increased beyond the threshold value β, the down-shift device 50 holds the necessity of down-shift operation and produces the down-shift signal e at a time $t_2$ so that the down-shift operation is made from the fourth stage to the third stage.

When the down-shift operation is made, the actual vehicle speed Vn is reduced and the throttle opening is increased temporarily. Then, the vehicle speed begins increasing and the throttle opening begins decreasing. Next, the vehicle speed gradually converges to the target speed Vo and the throttle opening becomes substantially constant. In other words, the vehicle reaches a steady running condition D.

The steady running condition lasts until the end of the uphill road. When the uphill road has ended, the throttle opening is remarkably reduced to an opening before entering the uphill road.

When the vehicle runs into a relatively short uphill road, the down shift operation is made in the same way as when it runs into the long uphill road.

Namely, the down-shift operation is made when the difference DV between the actual speed Vn and the target speed Vo exceeds the threshold β. Alternatively, the down-shift operation is made when the throttle opening increases beyond a threshold. Further, the down-shift may be made when the difference DV between the actual speed Vn and the target speed Vo exceeds the threshold β and the throttle opening increases beyond the threshold.

In this case, the uphill road ends at time $t_3$ before the steady running condition is accomplished, for example, when the throttle opening is being increased just after the down-shift operation. When the uphill road is ended, the throttle opening is continuously increased until time $t_4$ when the throttle opening takes a maximum value. Then the throttle opening is remarkably reduced to an opening before entering the uphill road.

| Uphill | End | Judgment |

As aforementioned, the up-shift operation is made when the uphill road has ended if the down-shift operation is made during the uphill road running. For this purpose, a judgment is made as to whether or not the uphill road has ended.

In the case of the long uphill road, the steady running condition is established during the uphill road running. Thus, the end of the uphill road can be found by detecting a remarkable reduction of throttle opening from that in the steady condition.

In detail, the steady condition judge device 51 holds the steady condition D in the uphill running as shown in FIG. 5.

In the steady condition, the actual vehicle speed Vn converges substantially to the target speed Vo wherein both the difference DV between the actual vehicle speed Vn and the target vehicle speed Vo and an acceleration dV ( differential value of the actual vehicle speed Vn) are small.

Thus, the steady condition can be held as the difference DV and the acceleration dV are smaller than thresholds.

According to the present invention, the judgment for the steady condition with regard to the thresholds is made based on what is known as fuzzy theory.

The steady condition judge device 51 calculates the gravity center with regard to the difference DV and the acceleration dV based on the input and output membership functions. If the central gravity is greater than a threshold Γ, the steady condition judge device 51 holds the steady running condition. With regard to the procedure for calculation of the central gravity, the disclosure of U.S. patent application No. 07/668,143 filed on Mar. 11, 1991 by ANAN et al and assigned to the same assignee as the present application, is incorporated herein by reference.

The uphill end is detected by means of a second uphill end judge device 53 based on the steady condition.

The second uphill end judge device 53 holds an uphill end has occurred when the throttle opening is reduced after the steady condition beyond a threshold $\delta_2$ which is provided for judging the uphill end or, in other words, when the reduction of the throttle opening $DTH_2$ is greater than the threshold $\delta_2$. In detail, The uphill end judge device 53 starts integrating the difference $(A_2-A_1)$ between output of the pull control signal $A_2$ and output of the release control signal $A_1$ from time $t_2$ when the down-shift operation is made from the fourth stage to the third stage. In this case, the signal $A_2$ is counted and integrated as a positive number and the signal $A_1$ is counted and integrated as a negative number every time when the routine is executed. The uphill end judge device 53 stores the integrated value of the difference $(A_2-A_1)$ as a reference value when a steady condition judge signal f denoting that the steady condition is detected is inputted from the steady condition judge device 52. The uphill end device 53 subtracts an integrated value of the difference inputted with a predetermined interval from the reference value. When the remaining value is greater than the threshold $\delta_2$, the uphill end judge device 53 holds that the uphill road has ended.

Next, there is described an uphill end judgment for a relatively short length.

Figure 3:
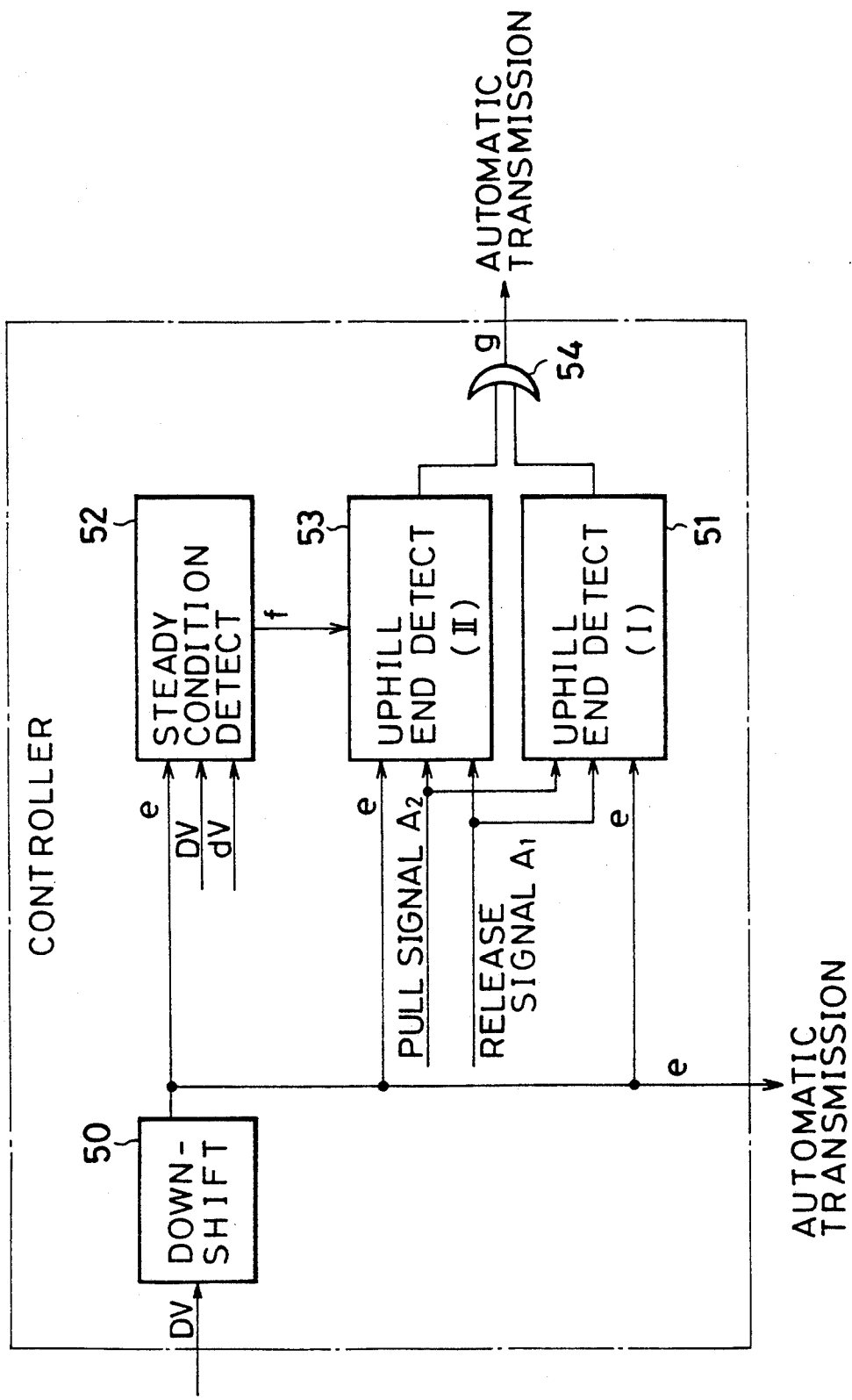
FIG. 3 is a block chart of the controller 8.

As aforementioned, it is impossible to judge the uphill end based on the throttle opening reduction in the steady condition because the uphill road ends before the steady condition is established. Therefore, the uphill end is judged based on a throttle opening reduction from a maximum value after the down-shift operation in the uphill running. The first uphill end judge device 51 shown in FIG. 3 calculates the throttle opening reduction $DTH_1$ from the maximum throttle opening (throttle opening at time $t_4$) as shown in FIG. 5. When the throttle opening reduction $DTH_1$ is greater than the threshold $\delta_1$, the judge device 51 holds the end of the uphill road.

In detail, the uphill end judge device 51 starts integrating the difference $(A_2-A_1)$ between output of the pull control signal $A_2$ and output of the release control signal$_1$ from time $t_2$ when the down-shift operation is made from the fourth stage to the third stage. In this stage, the signal $A_2$ is counted and integrated as a positive value and the signal $A_1$ is counted and integrated as a negative value every time when the routine is executed. The uphill end judge device 51 stores the integrated value of the difference $(A_2-A_1)$ as a reference value when a steady condition judge signal f, denoting that the steady condition is detected is inputted from the steady condition judge device 51. The uphill end device 51 subtracts an integrated value of the difference inputted with a predetermined interval from the reference value. When the throttle opening reduction $DTH_1$ is greater than the threshold $\delta_1$, the judge device 51 holds that the end of the uphill road has been reached.

The integrated value of the difference $(A_2-A_1)$ corresponds to the throttle opening. The outputs from the first and second uphill end judge devices 51 and 53 are introduced into OR circuit 54. If either the first or the second uphill end judge devices 51, 53 holds the uphill road end has been reached, the OR circuit produces an up-shift signal g for shifting from the third to fourth stages to the automatic transmission.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A constant-speed cruise control system for a vehicle comprising:

means for detecting an actual speed of a vehicle, means, manually operated by a driver, for setting a target speed for the vehicle, means for controlling the actual speed of the vehicle so that is approaches the target speed by adjusting an engine output, down-shift means for making a down-shift operation of a transmission so as to accomplish the target speed under a predetermined condition when the vehicle runs on an uphill road, detecting means for detecting a maximum value of the engine output after the down-shift operation is made, difference detecting means for detecting a difference between said maximum value and a present value of the engine output, and uphill end judge means for judging that an end of the uphill road has been reached by the vehicle when said difference exceeds a first predetermined value.

2. A constant-speed cruise control systems as recited in claim 1 wherein the means for controlling the actual speed of the vehicle controls a throttle opening.

3. A constant-speed cruise control system as recited in claim 2, wherein a maximum value of the throttle opening is obtained and stored by storing a throttle opening greater than a stored value after the down-shift operation, and a reduction of the throttle opening is obtained by calculating a difference between the stored maximum value and the latest throttle opening detected.

4. A constant-speed cruise control system as recited in claim 2, wherein an up-shift operation is made when the end of the uphill road is determined to have been reached by the vehicle by the uphill end judge means.

5. A constant-speed cruise control system as recited in claim 2, wherein the uphill end judge means judges that an end of the uphill road has been reached by the vehicle when the engine output is reduced beyond a second predetermined value after a steady condition in which the vehicle speed settles down is established on the uphill road.

6. A constant-speed cruise speed control system as recited in claim 5, wherein the first predetermined value is greater than the second predetermined value.

7. A constant-speed cruise control system as recited in claim 1 wherein the means for controlling the actual speed controls the engine output in accordance with a difference between the actual speed and the target speed.

8. A constant-speed cruise control system as recited in claim 2, wherein the down-shift operation is made when the throttle opening increases beyond a threshold.

9. A constant-speed cruise control system as recited in claim 8 wherein the down-shift operation may be made when the difference between the actual speed and the target speed exceeds the threshold and the throttle opening increases beyond a threshold.

* * * * *